Sept. 5, 1939.  A. L. ARMENTROUT ET AL  2,171,840
METHOD FOR DETERMINING THE POSITION OF CEMENT SLURRY IN A WELL BORE
Filed Oct. 25, 1937   3 Sheets-Sheet 2
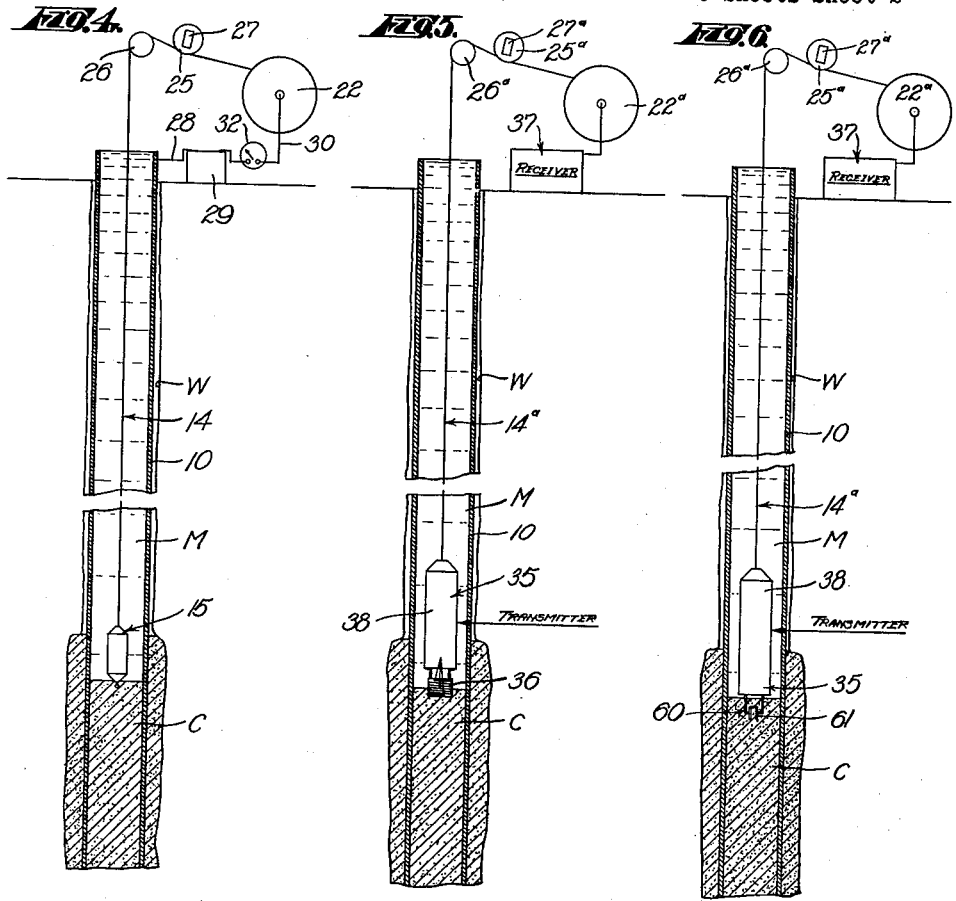
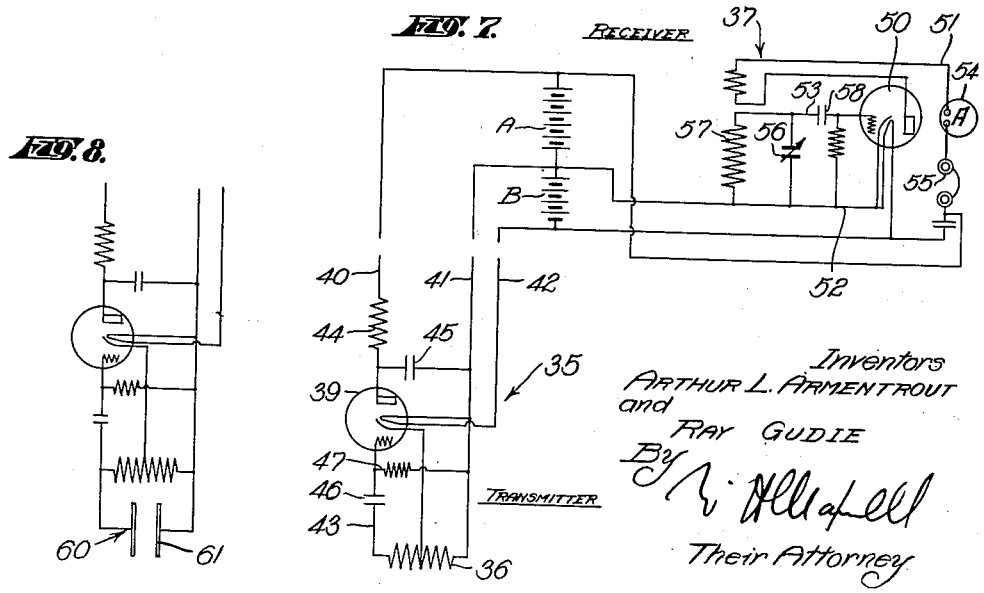
Inventors
ARTHUR L. ARMENTROUT
and
RAY GUDIE
By
Their Attorney

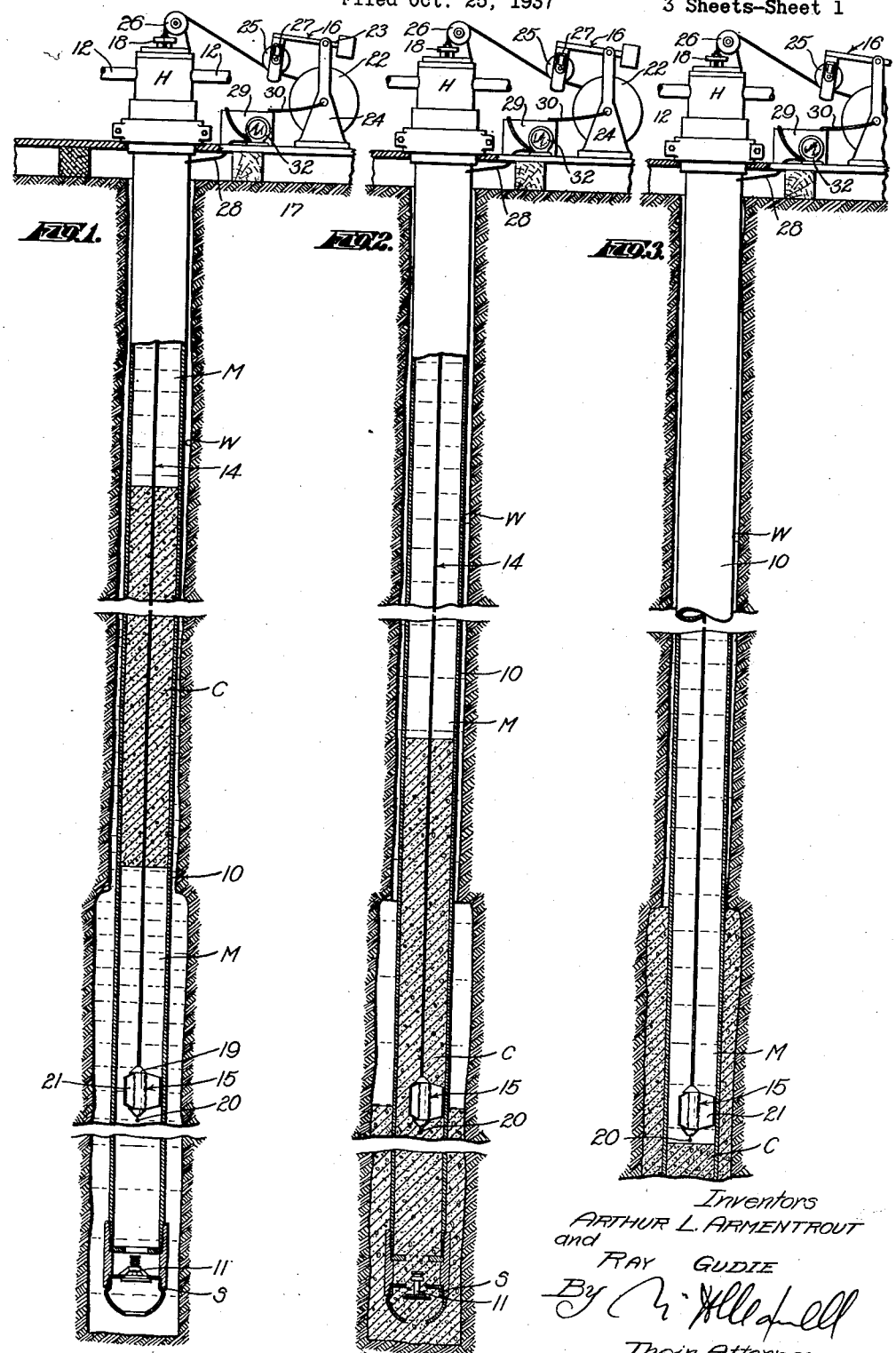

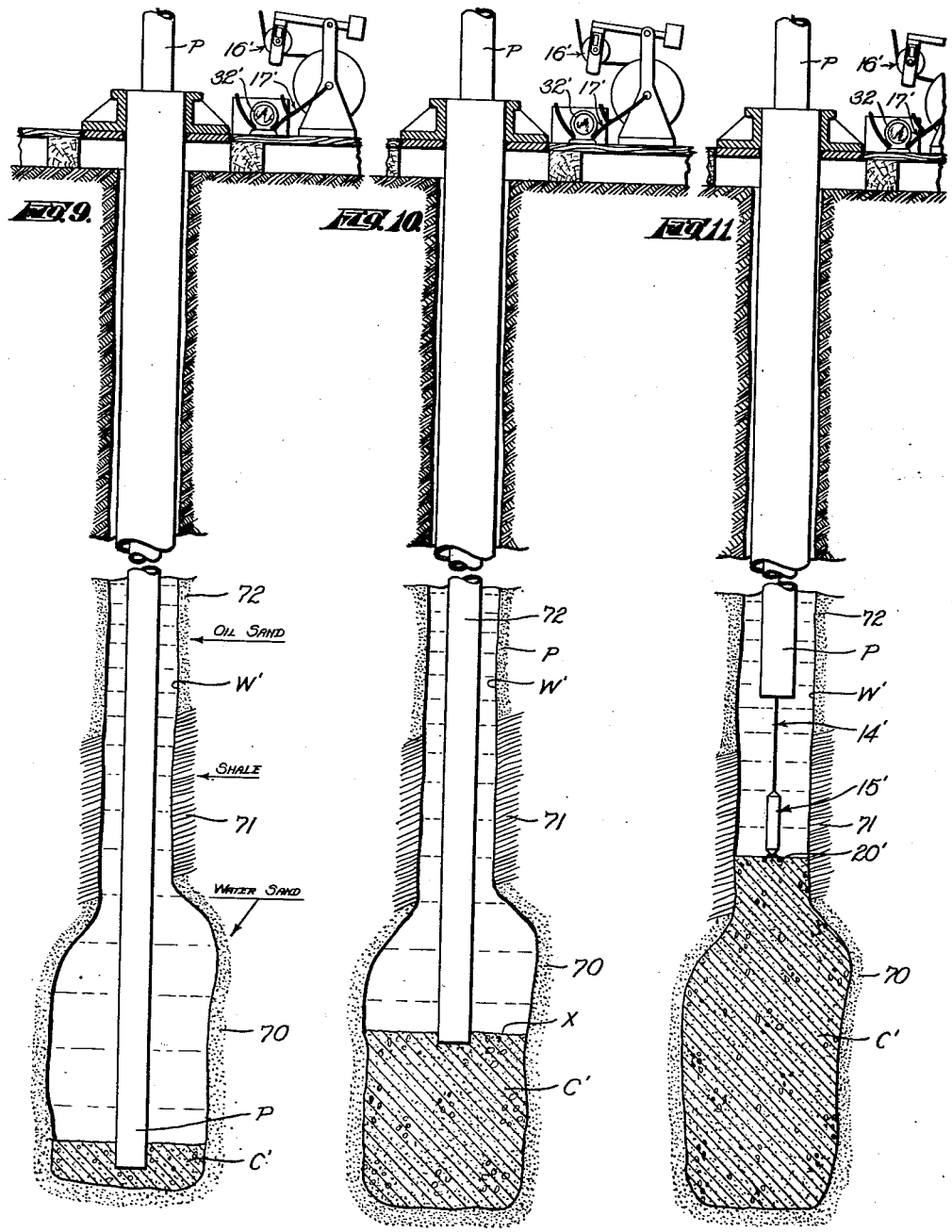

Patented Sept. 5, 1939

2,171,840

UNITED STATES PATENT OFFICE 2,171,840

METHOD FOR DETERMINING THE POSITION OF CEMENT SLURRY IN A WELL BORE

Arthur L. Armentrout and Ray Gudie, Los Angeles, Calif., assignors to Baggah Corporation, Los Angeles, Calif., a corporation of California Application October 25, 1937, Serial No. 170,862

11 Claims. (Cl. 166—21)

This invention relates to well drilling and well drilling equipment, and relates more particularly to a method for determining the location of a body of cement slurry in a well bore at the time of installation and before the cement slurry hardens or attains its initial set. A general object of this invention is to provide a rapid commercially practical method for accurately determining the location of a body of cement slurry in a well.

In the course of drilling and bringing in deep wells such as oil wells and gas wells it is necessary to seal off any unwanted fluid or substance such as water from the interior of the well casing so the oil or gas can be produced free and uncontaminated from any foreign substance. This is done by cementing the casing in the well to provide a cement seal or shut off around the lower portion of the casing which excludes the water, etc. The cement slurry generally used in cementing operations in well bore usually consists of a homogeneous mixture of approximately 50% to 70% high grade Portland cement and from 30% to 50% water. A water bearing stratum at the lower end of a well is sometimes sealed off by what is known as a "bottom plug" which is a body of cement introduced in the lower portion of the well to prevent the entrance of the water into the well. Cement is also employed to seal off leaks in the well casing and for various other purposes. In carrying out such cementing operations it has been the usual practice to estimate the quantity of cement required by calculating the theoretical size or volume of the space to be occupied by the cement and then introducing this volume of cement into the well. In many instances the actual size or capacity of the space that receives the cement is much greater than estimated with the result that the cement job is a failure or is incomplete. The present methods employed for testing a cement job are costly and time consuming and cannot be made for several days after the introduction of the cement slurry or until it sets or hardens. In some instances it is necessary to repeatedly introduce a charge of cement slurry into the well, allow the charge to harden and then test the seal, and these repeated operations greatly delay the completion of the well and materially add to the cost of the operations.

Another object of this invention is to provide a method for accurately determining the position of the upper surface or the lower surface, or both, of a body of cement slurry in a well at the time of the introduction of the cement slurry in the well or immediately thereafter. The method of the present invention provides for an accurate determination of the position of a body of cement slurry in the well, or, if desired, the vertical dimension of the body of cement slurry at the time of its introduction or immediately thereafter, whereby the operator may be immediately made aware of the necessity for additional cement slurry to complete the cementing operations and have a knowledge of the location of the cement slurry and, thereafter, a knowledge of the efficiency of the seal formed by the cement slurry without resorting to further tests.

Another object of this invention is to provide a method of the character mentioned that may be rapidly carried out without employing expensive or special cementing equipment.

A further object of this invention is to provide a method of the character mentioned that may be employed to accurately locate the cement slurry in the well when the cement slurry is introduced by any of the usual methods and when employed to provide seals for special purposes.

The various objects and features of our invention will be fully understood from the following detailed description of typical preferred forms of apparatus and manners of carrying out the method of the invention, throughout which description reference is made to the accompanying drawings, in which:

Fig. 1 is a longitudinal sectional view of a typical well, illustrating a body of cement slurry passing downwardly in the well casing and showing one form of apparatus employed by the invention arranged to make a test. Fig. 2 is a view similar to Fig. 1 illustrating the body of cement slurry passing the electrode unit. Fig. 3 is a view similar to Fig. 1 showing the upper surface of the body of the cement slurry at or adjacent the electrode unit. Fig. 4 is a diagrammatic view of the apparatus illustrated in Figs. 1, 2 and 3 showing the electrode submerged in the upper surface portion of the body of cement slurry. Fig. 5 is a view similar to Fig. 4 illustrating another form of apparatus. Fig. 6 is a view similar to Fig. 5 showing still another form of apparatus. Fig. 7 is a wiring diagram of the apparatus illustrated in Fig. 5. Fig. 8 is a wiring diagram of the transmitter of the apparatus illustrated in Fig. 6 and Figs. 9, 10 and 11 are longitudinal sectional views of a well illustrating the manner of employing the method and apparatus of the invention to test a "bottom plug".

The method of the present invention may be employed to locate the position of a body of cement slurry in a well when carrying on practically any type of well cementing operation, and the method is suited for use in conjunction with various types of well cementing equipment. In the following detailed description we will describe several forms of apparatus employed in connection with typical well equipment and typical well cementing apparatus to carry out the method of the invention for the purpose of determining the location of cement slurry in the well. It is to be understood that the invention is not to be construed as limited or restricted to the specific forms of the apparatus or the particular applications of the method about to be described, but that it is to be taken as including any features or modifications that may fall within the scope of the claims.

Figs. 1 to 4, inclusive, of the drawings illustrate one form of the apparatus employed to determine the location of a body of cement slurry C in a well during the course of cementing the lower portion of a casing 10 in the well to effect a shut-off or to provide a seal about the casing. It is believed that the method employed in this particular situation will be best understood following a disclosure of the well equipment, the cementing equipment and the said apparatus and we will proceed with a detailed description of these elements.

The well equipment and the cementing equipment illustrated in Figs. 1 to 4, inclusive, of the drawings comprises the casing 10 lining the well W. The casing 10 projects downwardly into an open uncased lower portion of the well. A cement shoe or float shoe S is provided on the lower end of the casing 10 and has a spring held valve 11 operable to close off the lower end of the casing against the entrance of the well fluid so that the casing may be floated into the well. The shoe S and the valve 11 are frangible so that they may be drilled up following the cementing operation. A cement head H is provided on the upper end of the casing 10. The head H is provided with pipes 12 for the admission and discharge of fluid and to facilitate the introduction of the cement into the well. In accordance with the usual practice the casing 10 is suspended from its upper end to have its lower end a short distance above the bottom of the well W. It will be assumed that the well W contains water or the rotary mud M usually employed in connection with the rotary method of well drilling.

The form of apparatus illustrated in Figs. 1 to 4, inclusive, of the drawings includes, generally, a conductor or line 14 to be run into the well W, an electrode unit 15 on the lower end of the line 14, means 16 for measuring the line 14 to indicate the position of the unit 15 in the well, and an electrical circuit 17 providing a resistance gap at the electrode unit 15.

The line 14 is provided to carry or suspend the electrode unit 15 and to carry the electrical current to the unit. The line 14 is preferably a well insulated electrical cable or conductor adapted to be exposed to the fluids in the well W without shorting. The line 14 is flexible to be readily handled or reeled up and, if desired, may be marked with calibrations of length to facilitate its measurement. In use the line 14 is passed through a suitable gland 18 on the upper end of the head H to extend downwardly through the casing 10.

The electrode unit 15 is intended to be run into the well on the line 14 to locate the cement slurry C or to determine the depth or the vertical dimension of the body of cement slurry in the well. The unit 15 preferably includes a weight or a body 19 secured to the lower end of the line 14 and one or two electrodes carried by the weight 19 and exposed to the fluid in the well. The weight 19 may be a simple, cylindrical member formed of lead or other material of relatively high specific gravity and of sufficient weight to carry the line 14 into the well and to maintain the line under suitable tension when in the well. In the form of the invention illustrated in Figs. 1 to 4, inclusive, of the drawings there is a single electrode 20 embodied in the unit 15. The electrode 20 is electrically connected with the electrical conducting line 14 and projects from the lower end of the weight 19 to be exposed to the fluid in the well or in the casing 10. When the unit 15 is provided with a single electrode 20 the current is carried by the line 14 and the casing 10 and therefore there is a resistance gap between the electrode 20 and the casing 10. It is desirable to maintain the electrode 20 substantially centralized in the casing 10 so that the resistance gap between the electrode 20 and the casing is substantially uniform. Insulated guide fins 21 are provided on the weight 19 and are engageable with the casing 10 to maintain the unit 15 and its electrode 20 centralized in the casing.

Various methods and means may be employed to measure the line 14 for the purpose of determining the position of the electrode unit 15. It is preferred, however, to employ the means 16 for this purpose. The line measuring means 16 is in the nature of a line reeling mechanism provided with a measuring device. As illustrated in the drawings the means 16 includes a winding drum or reel 22 on which the line 14 is wound. A counterbalanced pivoted lever 23 is supported on the frame 24 of the reel 22 and carries a metering or measuring pulley 25. The line 14 passes from the reel 22 to the pulley 25 and then to a pulley 26 on the head H. The pulley 26 directs the line downwardly through the gland 18 and into the casing 10. The pulley 25 is urged against the line 14 by its own weight and the weight of the associated parts to be rotated by the line. A revolution counter or meter 27 is driven by the pulley 25. The meter 27 is calibrated to indicate the length of the line 14 in the well or more properly to indicate the position of the electrode unit 15 in the well.

The circuit 17 is provided to produce and maintain a resistance gap at the electrode unit 15 in and through the fluid in which the unit is submerged. In the form of the apparatus illustrated in Figs. 1 to 4, inclusive, of the drawings where the unit 15 has only one electrode 20 the casing 10 forms a part of the circuit 17, that is, one lead 28 of the circuit 17 extends from a battery 29 or other suitable source of electrical power to the casing 10. A second lead 30 extends from the other terminal of the battery 29 to the reel 22 where it is electrically connected with the line 14. The circuit 17 is completed through the line 14 to the electrode 20 and then through the fluid in the space or gap between the electrode and the surrounding casing 10. The fluid in the well or the casing 10 between the electrode 20 and the casing thus forms a resistor or resistance in the circuit 17. A suitable galvanometer or resistance meter 32 is connected in the circuit 17 to indicate the resistance in the circuit. In practice the meter 32 may be interposed in the lead 30. As the resistance in the leads 28 and 30, the line 14 and the casing 10 remains substantially uniform or varies only slightly, a substantial change in the resistance or conductivity of the water, mud, cement or other fluid in the gap between the electrode 20 and the casing 10 is at once indicated by the meter 32. The meter 32 may, if desired, be a recording meter to produce records of changes in the resistance in the circuit 17.

Typical rotary mud or fresh water and cement slurry have widely different electrical resistances. In the event that the rotary mud M or water in the well is "weighted" with barium, ferrous materials, or the like, so that its electrical conductivity is comparable to that of the cement slurry C it is preferable to introduce a quantity of fresh water into the casing C ahead of the cement slurry as well as a quantity of fresh water to immediately follow the body of cement slurry through the casing, this water forming a stratum of relatively high resistance immediately above and below the body of cement slurry.

Accordingly, movement of the electrode 20 from the rotary mud M or fresh water into the cement slurry C, or vice versa, will be accompanied by a marked change in the resistance in the circuit 17, which sudden change will be indicated by the meter 32. Cement slurry has a much higher conductivity than typical rotary mud or fresh water and in the event that the electrode unit 15 is moved, or the cement slurry C is moved past the unit 15, so that the mud M or fresh water in the resistance gap between the electrode 20 and the casing C is replaced by the cement slurry the meter 32 immediately gives an appreciably lower reading.

We shall assume in the following explanation and description that the rotary mud M or water has a higher resistance than the cement slurry.

In employing the method of the invention with the apparatus illustrated in Figs. 1 to 4, inclusive, of the drawings and for the purpose of determining the position of the body of cement slurry C in the well, the method includes, generally, the positioning of the electrode unit 15 at a selected point in the well or in the casing 10, the delivery or introduction of a body of cement slurry C into the casing 10 to encase the lower portion of the casing, and the reading of the meter 32 in conjunction with the meter 27 to note changes in the resistance in the circuit 17 when the cement slurry C moves past the said point.

The electrode unit 15 may be run into the well or the casing 10 on the line 14 at or immediately following the application of the cement head H to the well preparatory to the cementing operation. In one manner of carrying out the method of the invention the unit 15 is lowered through the casing 10 to the plane to be occupied by the upper surface of the body of cement slurry C. For example, in Fig. 1 of the drawings it may be assumed that the electrode unit 15 has been lowered to a plane to be occupied by the upper surface of the body of cement that is to encase the lower end part of the casing 10. The exact position of the electrode unit 15 may be determined by the meter 27 and the reel 22 may be operated to arrange the unit 15 in the selected position. It may be assumed that the well W is initially occupied by water or the rotary mud M so that when the unit 15 is lowered to the position illustrated in Fig. 1 of the drawings it is submerged in the mud M or water. The resistance in the circuit 17 may be noted at this time by reading the meter 32.

The cement slurry C may be introduced in the casing 10 in the usual manner, for example, it may be pumped through a pipe 12 of the head H to move down in the casing C as an integral mass. It may be desired or necessary to force the body of cement slurry C downwardly through the casing 10 and its shoe S under pump pressure. The quantity of cement introduced in the casing 10 may be determined or calculated in the usual manner. The mass or body of cement slurry C pumped downwardly through the casing 10, as described above, displaces the mud M or water from below it and moves downwardly to surround the electrode unit 15. The body of slurry C is followed by a column of water or mud M. When the cement slurry C replaces the mud M or water in the resistance gap between the electrode 20 and the casing 10 the resistance in the circuit 17 drops and this change in resistance is indicated by the meter 32. Thus the operator is made aware of the fact that the body of cement slurry C has reached the electrode unit 15. The mass or body of cement slurry C flows downwardly through the shoe S and upwardly around the lower portion of the casing 10.

When the upper surface of the mass or body of cement slurry C reaches and passes the electrode 20 so that the electrode is again contacted by the mud M or the above mentioned water, the resistance in the circuit 17 suddenly increases and this change is made apparent by the meter 32. This indicates to the operator that the entire mass or body of the cement slurry C has passed the electrode unit 15 and is in the correct position. In some instances it is necessary to determine where the upper or lower surface of the body of the cement slurry C is in the well or casing. The upper or lower surface of the cement may be accurately located by merely raising or lowering the unit 15 on the line 14 until the electrode 20 moves out of the cement slurry and into the mud M or the water above or below the cement, at which time the resistance in the circuit 17 immediately increases and the meter 32 gives an indication of the change in the circuit resistance which reading may be taken with the reading of the meter 27, the meter 27 indicating the position of the electrode 20 in the well at the time that it passes from the cement slurry C into the mud M or water and therefore indicates the exact position of either the upper or lower surface of the cement slurry. It will be understood that if the upper surface of the body of cement slurry C is found to be below the point desired additional cement slurry may be pumped or passed into the casing C to raise the upper surface of the body of cement slurry to the desired plane. To determine the exact quantity of cement slurry C in the casing 10 or to determine the vertical dimension of the cement slurry in the casing 10 it is only necessary to move the electrode unit 15 on the line 14 vertically through the mass of slurry from its upper surface to the shoe S. Upon the entrance of the electrode 20 into the cement slurry C the resistance in the circuit 17 drops so that the meters 32 and 27 indicate the depth of the upper surface of the cement and when the unit 15 engages the shoe S the tension on the line 14 is immediately reduced and the meter 27 will indicate the bottom of the column of cement slurry C in the casing 10. In most instances the position of the shoe S is known and it is only necessary to determine the position of the upper surface of the column of cement slurry C standing in the casing to determine the quantity of cement in the casing at the end of the cementing operation.

Figs. 5 and 7 of the drawings illustrate another form of apparatus and another manner of carrying out the method of the invention in which a marked variation in the inductance of a coil associated with a vacuum tube transmitter unit is indicated by a meter or earphones associated with a receiver at the ground surface to locate the upper or the lower surfaces, or both, of a body of cement slurry in the well.

The apparatus illustrated in Figs. 5 and 7 of the drawings comprises an electrical conducting line 14ª, a metering reel 22ª handling the line 14ª, an oscillating circuit transmitter 35 on the line 14ª having an induction coil 36 exposed to the fluid in the well or casing 10 and a receiver 37 at the ground surface for indicating a change in the frequency when the induction of the coil 36 is varied by the character of the material in its field.

The line 14ª and the reel 22ª may be the same as the line 14 and the line 22 described above. The reel 22ª is equipped with a metering pulley 25ª equipped with a meter 27ª. The line 14ª may be considered as passing from the metering pulley 25ª through a head at the upper end of the casing 10 and into the casing.

The transmitter 35 is in the nature of a vacuum tube oscillating circuit protected against the fluids in the well or casing 10 and having the induction coil 36 exposed to the fluids so that its field is occupied by the fluid in the casing 10. The various elements of the circuit or transmitter 35 with the exception of the coil 36 may be housed in a case 38 secured to the lower end of the line 14ª. The case 38 fully protects these various elements against the fluids in the well. The coil 36 may be carried on the lower end of the case 38 to have its winding or windings exposed to the fluids in the casing 10. It is to be understood that the circuit of the transmitter 35 may be varied as desired or found practical, and that the particular circuit illustrated diagrammatically in the drawings is not to be taken as restricting the invention.

The transmitter circuit shown includes a vacuum tube 39, a high voltage lead 40 for the plate of the tube 39, and a heater circuit for the tube 39 comprising a lead 41 and a lead 42. The leads 40, 41 and 42 supplying current to the tube 39 may be considered as extending through the insulated line 14ª to the surface of the ground where they are connected with suitable batteries A and B. The lead 41 is connected with one terminal of the coil 36. A line 43 extends from the other terminal of the coil 36 to the grid of the vacuum tube 39. A choke coil 44 is connected in the plate lead 40 and a by-pass condenser 45 is connected between the leads 40 and 41. A condenser 46 is provided in the lead 43 and a resistor 47 is connected between the leads 41 and 43 to provide the desired grid bias voltage.

The receiver 37 of the apparatus is intended to be arranged at the upper end of the well and has means for indicating or recording the variations in frequency resulting from variations in the inductance of the coil 36. The circuit of the receiver 37 may be varied as found necessary and the particular receiver illustrated in the drawings is not to be taken as restricting the invention. The more or less typical receiver 37 shown in the drawings includes a vacuum tube 50, a line 51 carrying current to the plate of the vacuum tube, a line 52 carrying current to the cathode of the vacuum tube and a line 53 connected with the grid. The lines 51 and 52 are connected with the batteries A and B. An ammeter or micro-ammeter 54 is interposed in the line 51 to indicate the plate voltage and earphones 55 may also be connected in the line 51 to facilitate the reception of the signals. If desired an oscilloscope may be connected in the line 51 in place of the meter 54 or in addition to the meter 54 to produce a record of the signal changes. The grid circuit of the tube 50 is suitably biased by a variable condenser 56 and resistors 57 connected between the lines 52 and 53 and a condenser 58 in the line 53. The receiver 37 is tuned to beat against the transmitter 35.

In carrying out the method of the invention with the apparatus illustrated in Figs. 5 and 7 of the drawings the transmitter 35 is handled by the line 14ª which in turn is handled by the reel 22ª in the same manner as the electrode unit 15 described above. It is believed that it will be apparent how the line 14ª carrying the case 38 and the induction coil 3)6 of the transmitter 35 may be manipulated in the well to locate the position of a body of cement slurry C in the well. Assuming that the transmitter 35 is being lowered on the line 14ª, as shown in Fig. 5 of the drawings, so that the coil 36 is moving from the mud M or water into the cement slurry C, the mud or water in the field of the coil is being replaced by the cement slurry. As the character of the material in the field of the coil 36 governs the induction of the coil and as the inductance of the coil governs the frequency of the signals transmitted it will be evident that movement of the coil 36 from the mud M into the cement slurry C will produce a change in the frequency which may be noted by the meter 54 or by the earphones 55, or that may be recorded by the oscilloscope when the latter is employed. In the event that the mass or body of the cement slurry C moves past or beyond the coil 36 or the coil 36 is drawn out of the cement slurry into the mud, the cement slurry in the field of the coil will be replaced by the mud or water to change the inductance of the coil and thereby change the frequency in the transmitter and receiver circuit, which change will be indicated by the meter 54 and may be heard by the earphones 55. The readings of the meter 54 and the changes in the signal noted by means of the earphones 55 are taken together with the readings of the line meter 27ª to accurately determine the position of the induction coil 36 at the time of the change in its inductance. Thus the exact position of the body of cement slurry C may be accurately determined or, if desired, the elevation of the upper or lower surface of the body of cement slurry C, and, therefore, the height of the column of the slurry may be easily and quickly determined with the apparatus.

Figs. 6 and 8 of the drawings illustrate a third form of apparatus employed in carrying out the method of the invention in determining the location of a body of cement slurry C in a well. In the apparatus illustrated in Figs. 6 and 8 the capacity or the power factor of the condenser 60 exposed to the fluid in the well or in the well casing 10, is measured or recorded and is considered in connection with the reading of the meter 27ª to determine the exact location of the body of cement slurry.

In this form of apparatus the above mentioned condenser 60 may comprise two spaced plates 61 connected through a low capacity circuit to a recording amplifier which in turn is connected to a direct reading capacity bridge at the surface of the ground. In the apparatus just mentioned the "dielectric" or material between the plates 61 of the condenser 60 determines capacity of the condenser and, therefore, determines the reading at the bridge and when the condenser 60 is moved out of the cement slurry C into the rotary mud M or water or is moved from the mud M or water into the cement slurry the capacity of the condenser 60 is varied and the bridge indicates or records a change in the capacity which indication taken together with the reading of the line meter 27ᵃ indicates the position of the body of cement slurry in the well.

In actual practice it may be preferred to directly connect the plates 61 of the condenser 60 with a transmitter circuit or a vacuum tube amplifier. As illustrated in the drawings the plates 61 of the condenser 60 are connected with the poles of the coil 36 of the transmitter 35 described above and illustrated diagrammatically in Fig. 7 of the drawings. The plates 61 are arranged to be exposed at the lower end of the case 38 of the transmitter 35 so that the fluid or material in the well or casing 10 forms the "dielectric" between the plates.

In employing the apparatus illustrated in Figs. 6 and 8 of the drawings the line 14ᵃ carrying the transmitter 35 is handled by the reel 22ᵃ and may be moved or manipulated in the casing 10 in any desired manner. As the "dielectric constant" of water or mud and the cement slurry C markedly differ the capacity of the condenser 60 is materially changed when the line 14ᵃ is manipulated to move the condenser 60 from the mud M or water into the cement slurry or from the cement slurry into the mud M or water. This change in the capacity of the condenser 60 varies the signal of the receiver 37 or changes the reading of the bridge at the ground surface. The transmitter 35 provided with the exposed condenser 60 may be employed in the same manner as the above described electrode unit 15 to determine the exact position of the upper surface or the lower surface, or both, of a body of cement slurry C in a well or to determine the height of a column of cement slurry in a well or a well casing.

Figs. 9, 10 and 11 of the drawings illustrate the manner in which the method of this invention may be employed to determine the progress in a "bottom plug" cementing job and to test the sufficiency and character of the operation at the time of the introduction of the cement slurry.

Fig. 9 illustrates a portion of a typical well W' whose lower portion enters a water bearing sand or stratum 70. A stratum 71 of shale is located above the water bearing stratum 70 and a producing sand or oil bearing stratum 72 is above the shale stratum 71. As is often the case in situations of this character the lower portion of the well in the stratum 70 is enlarged in size or diameter and a calculation of the capacity of this portion of the well obtained by considering the diameter of the well bore and the vertical dimension of the portion of the bore in the stratum 70 will be inaccurate. In order to close off the water bearing stratum 70 and exclude its water from the well W' a mass or body of cement slurry C' is introduced into the well to occupy the portion of the well in the stratum 70. This may be readily accomplished by passing or forcing the cement slurry downwardly through a pipe P. The pipe P may extend from adjacent the bottom of the well W to the surface of the ground and the cement slurry may be passed downwardly through it in any desired manner to discharge into the enlarged lower portion of the well bore. As the quantity of cement slurry C' required can only be estimated by calculating the theoretical capacity of the portion of the well W' entering the stratum C' the upper surface of the body of cement slurry C' introduced into the well may be at a plane such as indicated at X in Fig. 10 of the drawings when the cement has been delivered to the well.

An electrode unit 15' may then be lowered through the pipe P on the line 14' to determine the location of the upper surface of the body of cement slurry C'. In Fig. 11 of the drawings we have illustrated an electrode unit 15' provided with two spaced electrodes 20' similar to the electrode 20 described above. The electrodes 20' are arranged so that there is a definite resistance gap between them that is occupied by the fluid in the well. The line 14', the means 16' and the electrode unit 15' may be identical with the previously described corresponding elements illustrated in Figs. 1 to 4, inclusive, of the drawings. The testing circuit 17' connected with the electrodes 20' may be the same as the above described circuit 17 except that its two main leads are connected with the two electrodes 20'. It is to be understood that the apparatus illustrated in Figs. 1 to 4, inclusive, the apparatus illustrated in Figs. 5 and 7, or the apparatus illustrated in Figs. 6 and 8 may be employed in connection with the "bottom plug" cementing operation illustrated in Figs. 9, 10, and 11, if desired, and that these apparatuses are manipulated in substantially the same manner to obtain the desired information.

Assuming that the initial charge of cement slurry C' introduced into the well has its upper surface at the plane X, the line 14' is run into the well until the electrodes 20' enter the body of cement slurry. The entrance of the electrodes 20' into the cement slurry C' is accompanied by a variation in the reading of the meter 32' of the circuit 17' and this change in reading of the meter 32' taken together with the reading of the line meter 27' indicates the depth or position of the plane X. Thus it will be found that insufficient cement slurry has been delivered to the well to seal off the water bearing stratum 70. An additional charge of cement slurry is then passed or pumped downwardly through the pipe P and when this operation has been completed the line 14' is manipulated to bring the electrode unit 15' to a position where its electrodes 20' enter the upper portion of the cement slurry C'. The point of entrance of the electrodes 20' into the cement slurry C' is noted by taking into account the readings of the meters 32' and 27' and if it is found that the upper surface of the cement slurry C' is above the water sand or the water bearing stratum 70 the cementing operation is completed. Fig. 11 of the drawings discloses the electrode unit 15' in a position where its electrodes 20' are entering the upper surface portion of the body of cement slurry C' and shows the cement slurry C' completely occupying the portion of the well in the stratum 70 and occupying a part of the well bore passing through the stratum 71 so that the water sand or stratum 70 is completely sealed off from the remainder of the well. Thus it may be readily determined when a complete and full shut off is obtained.

It is to be particularly noted that the method of the present invention provided for an accurate determination of the upper surface of the cement slurry C' at the time of, or immediately following, the introduction of the cement slurry into the well so that the "bottom plug" may be completed at one operation or at one time, and the operator is assured of a complete shut off without the necessity of making further tests.

Having described only typical preferred manners of carrying out the method of our invention, we do not wish to be limited or restricted to the specific details herein set forth, but wish to reserve to ourselves any variations or modifications that may appear to those skilled in the art or fall within the scope of the following claims.

Having described our invention, we claim:

1. The method of handling cement slurry in a well containing a fluid having an electrical conductivity different from that of the slurry comprising arranging a device in the well operable to pass an electrical current through the adjacent fluid, passing a body of the cement slurry down the well until it passes the said device to produce alternate submersion of the device in the slurry and the fluid in the well, indicating the resistance at said device, and measuring the depth of said device at the times of the change in resistance when said alternate submersion occurs.

2. The method of cementing a well containing a fluid having an electrical conductivity different from that of cement slurry comprising providing a device in the well operable to create an electrical field in the fluid in which it is submerged, indicating the inductance in said device, passing a body of cement slurry down the well to the device so that the slurry replaces the fluid in the field of the instrument, indicating the position of the device in the well, and noting the position of the device at the time of change in the inductance in said device when said replacement in the field occurs.

3. The method of cementing a well containing a fluid having an electrical conductivity different from that of cement slurry comprising arranging a device in the well operable to create an electrical capacity in a portion of the fluid in which it is submerged, indicating said capacity, indicating the position of the said device, passing a body of cement slurry down the well to the said device thereby producing a substantial change in the said capacity, and observing the position of said device at the time of substantial change in said capacity.

4. In a method of cementing a well containing a fluid having an electrical conductivity different from that of cement slurry, the arrangeemnt of a device in the well operable to create an electrical resistance gap in the fluid in which it is submerged, indicating at the surface of the ground resistance changes in said gap, indicating the position of said device by suspending the same on a metered line, passing a body of cement slurry down the well to the device to replace the said fluid in the gap of the device with cement slurry and thus change the resistance of the gap, and observing the position of said device at the time of the said change in the resistance of said gap.

5. The method of cementing a well containing a fluid having an electrical conductivity different from that of cement slurry comprising providing a device in the well operable to create an electromagnetic field in the fluid in which it is submerged, indicating changes in the inductance in said field, indicating the position of said device by handling the same on a metered line, passing a body of cement slurry down the well to the device to replace the fluid in the field of the device with cement slurry and thus change the inductance in the field, and observing the position of said device at the time of said change in the inductance in said field.

6. The method of cementing a well containing a fluid having an electrical conductivity different from that of cement slurry comprising providing a device in the well operable to create an electrostatic field in the surrounding fluid, indicating the position of the device by a metered line connected therewith, indicating the capacity of said field, passing a body of cement slurry down the well to move past the device so that the said field is alternately occupied by the fluid in the well and the cement slurry, and observing the position of the device at the time of substantial change in the capacity of said field.

7. The method of cementing a well containing a fluid having an electrical conductivity different from that of cement slurry comprising providing a device in the well responsive to changes in the electrical conductivity of the fluid in which it is submerged, indicating the responsiveness of the device, indicating the position of the device, passing a body of cement slurry down the well to move past the device so that said device is alternately submerged in the fluid in the well and the cement slurry, and observing the position of the device at the time of marked change in the responsiveness of the device.

8. The method of cementing a well containing fluid having an electrical conductivity different from that of cement slurry comprising providing a unit in the well having an electrical conductor exposed to the fluids therein, passing an electrical current through said conductor to flow through the surrounding fluid, passing a body of cement slurry down the well to surround and then pass the unit, metering the current to observe the change therein at the time of movement of the slurry past the conductor, and indicating the position of the unit at the time of said change.

9. The method of cementing a well containing fluid comprising, providing a device in the well which device is sensitive to the conductivity of the surrounding fluid to influence an electrical circuit, passing a body of cement slurry into the well to surround and pass the device and thereby influence the circuit, and indicating the position of the device when said circuit is influenced.

10. The method of cementing a well containing rotary mud comprising arranging a device in the well responsive to the electrical resistivity of the fluid in which it is submerged, providing an electrical circuit containing said device and an electrical meter, indicating the position of said device, introducing a body of cement slurry into the well to move down past said device, and observing the position of said device when said meter is affected by movement of the slurry past said device.

11. The method of cementing a well containing rotary mud comprising providing in the well a device responsive to the electrical resistivity of the fluid in which it is submerged, providing an electrical circuit containing said device and an electrical meter, indicating the position of said device by suspending the device on a metered line, passing a body of slurry down the well to said device, and observing the position of said device when said meter is affected by said device.

RAY GUDIE.
ARTHUR L. ARMENTROUT.